United States Patent
Le

(10) Patent No.: US 11,448,590 B2
(45) Date of Patent: Sep. 20, 2022

(54) METHOD FOR ANALYSING A GAS BY MEANS OF DOUBLE ILLUMINATION

(71) Applicant: ELICHENS, Grenoble (FR)

(72) Inventor: Thanh Trung Le, Grenoble (FR)

( * ) Notice: Subject to any disclaimer, the term of this patent is extended or adjusted under 35 U.S.C. 154(b) by 0 days.

(21) Appl. No.: 16/967,209

(22) PCT Filed: Feb. 1, 2019

(86) PCT No.: PCT/FR2019/050230
§ 371 (c)(1),
(2) Date: Aug. 4, 2020

(87) PCT Pub. No.: WO2019/150053
PCT Pub. Date: Aug. 8, 2019

(65) Prior Publication Data
US 2020/0363328 A1 Nov. 19, 2020

(30) Foreign Application Priority Data
Feb. 5, 2018 (FR) .......................................... 1850956

(51) Int. Cl.
*G01N 21/35* (2014.01)
*G01N 21/3504* (2014.01)
(Continued)

(52) U.S. Cl.
CPC ....... *G01N 21/3504* (2013.01); *G01N 21/314* (2013.01); *G01J 3/427* (2013.01); *G01N 2021/3196* (2013.01)

(58) Field of Classification Search
CPC ............. G01N 21/223; G01N 33/0098; G01N 33/483; G01N 33/4875; G01N 33/53;
(Continued)

(56) References Cited

U.S. PATENT DOCUMENTS 3,790,798 A * 2/1974 Sternberg ........... G01N 21/3504
250/345
5,026,992 A 6/1991 Wong
(Continued)

FOREIGN PATENT DOCUMENTS

CN 105738309 A * 7/2016
EP 3208601 A1 * 8/2017 ......... G01N 21/3504
(Continued)

OTHER PUBLICATIONS

International Search Report for International Application No. PCT/FR2019/050230, dated May 28, 2019, 7 pages (with translation).
(Continued)

*Primary Examiner* — Michael P Stafira
(74) *Attorney, Agent, or Firm* — TraskBritt

(57) ABSTRACT

A method—for measuring an amount of a gaseous species present in a gas—comprises placing the gas between a light source and a measurement photodetector. The light source is able to emit an incident light wave that propagates through the gas to the measurement photodetector. The gas is illuminated with the light source. A measurement intensity, of the light wave transmitted by the gas, is measured with the measurement photodetector. An intensity of a reference light wave, emitted by the light source in a reference spectral band, is measured with a reference photodetector. The illumination and measuring are performed at multiple measurement times, at each of which the gas's absorption of the incident light wave is estimated and an amount of the gaseous species is estimated on the basis of the estimated absorption. Estimating the absorption comprises applying a correction function, that varies over time, to the reference intensity.

7 Claims, 4 Drawing Sheets

(51) Int. Cl.
*G01N 21/31* (2006.01)
*G01J 3/427* (2006.01)

(58) Field of Classification Search
CPC ............. G01N 33/54366; G01N 33/66; G01N 35/00871; G01N 1/14; G01N 1/22; G01N 1/2258; G01N 1/4022; G01N 2001/002; G01N 2021/0106; G01N 2021/052; G01N 2021/1736; G01N 2021/396; G01N 2021/536; G01N 2021/7716; G01N 2021/8893; G01N 21/3563; G01N 21/532; G01N 21/5907; G01N 21/645; G01N 21/6486; G01N 21/71; G01N 21/72; G01N 21/76; G01N 21/7746; G01N 21/8483; G01N 2201/0637; G01N 2201/1215; G01N 2291/021; G01N 2291/0256; G01N 2458/30; G01N 2469/20; G01N 25/18; G01N 25/30; G01N 25/4833; G01N 25/4866; G01N 25/4873; G01N 27/026; G01N 27/04; G01N 27/185; G01N 27/26; G01N 27/3277; G01N 27/4045; G01N 27/4067; G01N 27/4074; G01N 27/4078; G01N 2800/04; G01N 29/022; G01N 30/461; G01N 30/74; G01N 31/00; G01N 31/12; G01N 33/0059; G01N 33/0063; G01N 33/0073; G01N 33/487; G01N 33/542; G01N 33/84; G01N 35/1097
See application file for complete search history.

(56) References Cited

U.S. PATENT DOCUMENTS

| | | | | |
|---|---|---|---|---|
| 5,252,060 | A * | 10/1993 | McKinnon | F23N 5/003 |
| | | | | 431/12 |
| 6,147,351 | A * | 11/2000 | Huiku | G01N 21/61 |
| | | | | 250/343 |
| 6,160,832 | A * | 12/2000 | Kleinschmidt | H01S 3/1392 |
| | | | | 372/20 |
| 9,574,995 | B2 | 2/2017 | Hutchings et al. | |
| 2011/0042570 | A1 | 2/2011 | Wong | |
| 2015/0053861 | A1* | 2/2015 | Wong | G01N 21/3504 |
| | | | | 250/343 |
| 2018/0120224 | A1* | 5/2018 | Dreyer | G01N 33/497 |

FOREIGN PATENT DOCUMENTS

| | | | | |
|---|---|---|---|---|
| EP | 3594661 A1 * | 1/2020 | | G01J 3/433 |
| FR | 3000548 A1 | 7/2014 | | |
| WO | WO-2006029929 A1 * | 3/2006 | | G01N 21/3504 |
| WO | 2007064370 A2 | 6/2007 | | |
| WO | WO-2009125413 A1 * | 10/2009 | | G01N 21/3504 |
| WO | WO-2010132367 A1 * | 11/2010 | | G01N 21/53 |
| WO | WO-2014143045 A1 * | 9/2014 | | G01J 3/42 |
| WO | WO-2017017447 A1 * | 2/2017 | | G01N 21/314 |

OTHER PUBLICATIONS

International Written Opinion for International Application No. PCT/FR2019/050230, dated May 28, 2019, 12 pages (with translation).

* cited by examiner

METHOD FOR ANALYSING A GAS BY MEANS OF DOUBLE ILLUMINATION

CROSS-REFERENCE TO RELATED APPLICATIONS

This application is a national phase entry under 35 U.S.C. § 371 of International Patent Application PCT/FR2019/050230, filed Feb. 1, 2019, designating the United States of America and published as International Patent Publication WO 2019/150053 A1 on Aug. 8, 2019, which claims the benefit under Article 8 of the Patent Cooperation Treaty to French Patent Application Serial No. 1850956, filed Feb. 5, 2018.

TECHNICAL FIELD

The technical field of the present disclosure is an optical method for analyzing a gas, this method employing a light source of black-body or gray-body type and measuring an absorption of a light wave emitted by the light source.

BACKGROUND

Optical methods are frequently used to analyze gases. Sensors allow the composition of a gas to be determined based on the fact that the component species of the gas have absorption spectral properties that are different from one another. Thus, if an absorption spectral band of a gas species is known, its concentration may be determined by estimating the absorption of the light passing through the gas, using the Beer-Lambert law. This principle allows the concentration of a gaseous species present in the gas to be estimated.

In the commonest methods, the analyzed gas lies between a light source and a photodetector, called the measurement photodetector, the latter being intended to measure a light wave transmitted by the gas to be analyzed, the light wave being partially absorbed by the latter. The light source is usually a light source emitting in the infrared, the method used usually being referred to as NDIR detection, the acronym NDIR meaning non-dispersive infrared. Such a principle has been employed frequently, and is, for example, described in documents U.S. Pat. No. 5,026,992 and WO2007064370.

Conventional methods generally comprise measuring a light wave, called the reference light wave, emitted by the source, the reference light wave not being absorbed, or absorbed negligibly, by the analyzed gas. Measurement of the reference light wave allows the intensity of the light wave emitted by the source to be estimated, or the light wave that would be detected by the measurement photodetector in the absence of absorption by the analyzed gas to be estimated. This technology is designated by the term "double beam." Comparison between the light wave in the presence of gas and the light wave without gas allows the absorption of the gas to be characterized. It is, for example, a question of determining an amount of a gaseous species in the gas, using the technology referred to as "absorption NDIR."

The reference light wave is measured by a reference photodetector. It may be a question of a reference photodetector different from the measurement photodetector, and arranged so as to be placed facing the light source, the reference photodetector being associated with a reference optical filter. The reference optical filter defines a reference spectral band, in which the gas to be analyzed does not exhibit significant absorption.

In one approach, described in US2011/0042570, a measurement photodetector and a reference photodetector are used, the two photodetectors detecting a light wave in the same spectral band, in the present case an absorption spectral band of $CO_2$. The reference photodetector is placed closer to the light source than the measurement photodetector. The comparison of the signals respectively measured by the measurement photodetector and the reference photodetector allows knowledge of the intensity of the light wave emitted by the source to be made redundant.

Document FR3000548 describes a $CO_2$ sensor comprising a measurement channel, in an infrared spectral band, and a reference channel, in a visible spectral band (0.4 µm to 0.8 µm). The reference channel is considered not to be influenced by the concentration of $CO_2$ in the measured gas. In order to take into account the variation in the emission spectrum of the light source, this document describes use of a function F, representative of the aging of the light source in the visible and infrared spectral bands, respectively. The function F is approximated by an identity function: thus, the aging of the light source in the infrared is considered to be equal to the aging of the light source in the visible.

The inventor has observed that recourse to a reference light wave may have certain drawbacks. He proposes a method allowing these drawbacks to be overcome, so as to improve the precision of the measurement.

BRIEF SUMMARY

A first subject of the present disclosure is a method for measuring an amount of a gaseous species present in a gas, the gaseous species being able to absorb light in an absorption spectral band, the method comprising the following steps:
a) placing the gas between a light source and a measurement photodetector, the light source being able to emit an incident light wave, the incident light wave propagating through the gas to the measurement photodetector, the measurement photodetector being able to detect a light wave transmitted by the gas, in the absorption spectral band;
b) illuminating the gas with the light source;
c) measuring, with the measurement photodetector, an intensity, called the measurement intensity, of the light wave transmitted by the gas, in a measurement spectral band, containing the absorption spectral band;
d) measuring, with a reference photodetector, an intensity, called the reference intensity, of a light wave called the reference light wave, the reference light wave being emitted by the light source in a reference spectral band;
steps b) to d) being carried out at a plurality of measurement times, the method comprising, at each measurement time:
e) on the basis of the reference intensity measured by the reference photodetector, and of the measurement intensity measured by the measurement photodetector, estimating an absorption of the incident light wave by the gas;
f) estimating an amount of the gaseous species, on the basis of the absorption estimated in step e);
the method being characterized in that step e) comprises taking into account a correction function, representative of a temporal variation in an intensity of the incident light wave in the measurement spectral band relative to an intensity of the incident light wave in the reference spectral band.

The light source may comprise a filament raised to a temperature allowing an emission of light in the illumination spectral band.

The correction function may be representative of a comparison between:

the intensity of the incident light wave, in the measurement spectral band;

the intensity of the incident light wave, in the reference spectral band; the comparison taking different values at various measuring times.

The comparison may be expressed in the form of a ratio or of a subtraction.

The correction function is preferably established beforehand in a calibration phase, comprising the following steps:

cal-i) placing a test light source, facing a measurement test photodetector, and facing a reference test photodetector, the test light source, the measurement test photodetector and the reference test photodetector being representative of the light source, of the measurement photodetector and of the reference photodetector, respectively;

cal-ii) illuminating the measurement test photodetector and the reference test photodetector with the test light source, during calibration times lying in a calibration period;

cal-iii) comparing a temporal variation in the intensity detected by the measurement test photodetector, in the measurement spectral band, with a temporal variation in the intensity detected by the reference test photodetector, in the reference spectral band.

The test light source may be pulsed, each pulse corresponding to one calibration time. The calibration period may contain at least 1000 calibration times.

The correction function may be established on the basis of a comparison, at various calibration times, between:

the intensity detected by the measurement test photodetector, normalized by an initial intensity detected by the measurement test photodetector;

the intensity detected by the reference test photodetector, normalized by an initial intensity detected by the reference test photodetector.

By initial intensity, what is meant is an intensity measured at an initial time of the calibration period.

Step e) may comprise, on the basis of the reference intensity measured at the measurement time and of the correction function, estimating an intensity that would be detected, at the measurement time, by the measurement photodetector, in the measurement spectral band, in the absence of gas. It may comprise, on the basis of the reference intensity measured at the measurement time and of the correction function, correcting the measurement intensity, the corrected measurement intensity corresponding to a measurement intensity in the absence of aging of the light source.

A second subject of the present disclosure is a device for determining an amount of a gaseous species in a gas, the device comprising:

a light source configured to emit an incident light wave that propagates to the gas, the incident light wave lying in an absorption spectral band of the gaseous species;

a measurement photodetector, able to detect a light wave transmitted by the gas, at various measurement times, in a measurement spectral band and to measure an intensity thereof, called the measurement intensity;

a reference photodetector, configured to measure an intensity, called the reference intensity, of a reference light wave emitted by the light source, in a reference spectral band, at the various measurement times;

a processor, for implementing steps e) and f) of a method according to the first subject of the present disclosure, on the basis of the reference intensity and of the measurement intensity.

Other advantages and features will become more clearly apparent from the following description of particular embodiments of the present disclosure, which are given by way of non-limiting examples, and shown in the figures listed below.

DETAILED DESCRIPTION

Figure 1A:
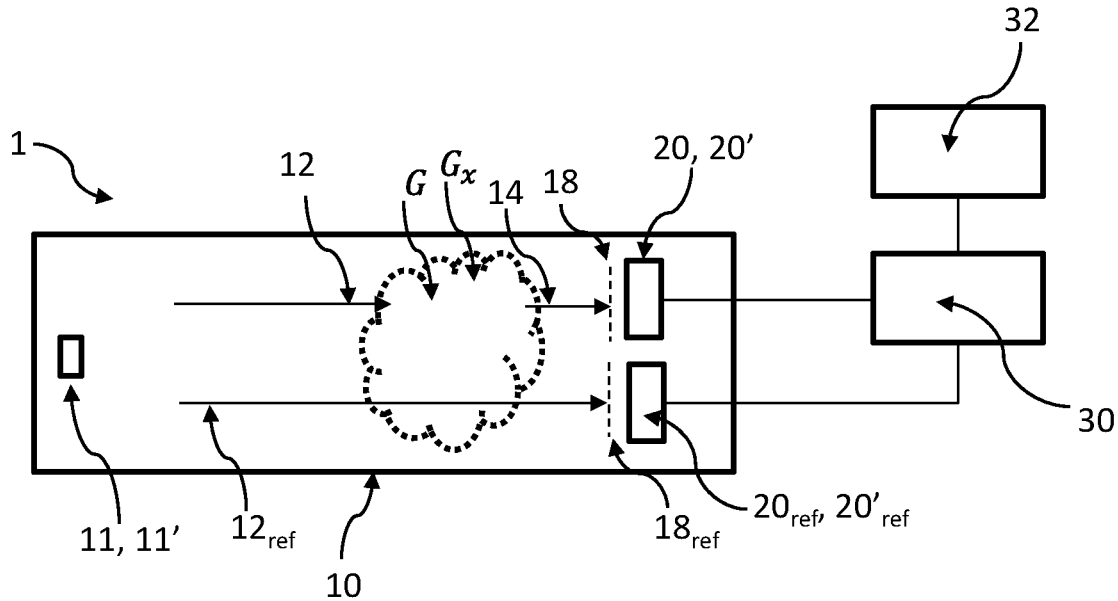
FIG. 1A shows an example of a device allowing the present disclosure to be implemented.

FIG. 1A is an example of a device 1 for analyzing gas. This device 1 comprises a chamber 10 defining an internal space inside of which are located:

a light source 11;

a photodetector, called the measurement photodetector 20;

a reference photodetector $20_{ref}$.

The light source 11 is able to emit a light wave 12, called the incident light wave, so as to illuminate a gas G lying in the internal space. The incident light wave 12 lies in an illumination spectral band $\Delta_{12}$. The photodetector (measurement photodetector 20) is configured to detect a light wave 14 transmitted by the gas G, under the effect of the illumination of the latter by the incident light wave 12. The light wave 14 is referred to by the term "measurement light wave." It is detected, by the measurement photodetector 20, in a measurement spectral band $\Delta_{20}$. The reference photodetector $20_{ref}$ is configured to detect a light wave $12_{ref}$ called the reference light wave, in a reference spectral band $\Delta_{ref}$. The reference spectral band $\Delta_{ref}$ is a spectral band in which the absorption of the light wave 12 by the gas G is considered to be negligible.

The reference spectral band $\Delta_{ref}$ is different from the measurement spectral band $\Delta_{20}$. The measurement spectral band $\Delta_{20}$ may notably be wider than the reference spectral band $\Delta_{ref}$. The measurement spectral band $\Delta_{20}$ may contain the reference spectral band $\Delta_{ref}$.

The gas G contains a gaseous species $G_x$ an amount $c_x(k)$ of which, a concentration of which for example, it is sought to determine at a measurement time k. This gaseous species absorbs a measurable percentage of the light in an absorption spectral band $\Delta_x$.

The light source 11 is able to emit the incident light wave 12, in an illumination spectral band $\Delta_{12}$, the latter possibly extending between the near ultraviolet and the mid infrared, for example between 200 nm and 10 µm, and most often between 1 µm and 10 µm. The absorption spectral band $\Delta_x$ of the analyzed gaseous species $G_x$ is comprised in the illumination spectral band $\Delta_{12}$. The light source 11 may notably be pulsed, the incident light wave 12 being a pulse of duration generally comprised between 100 ms and 1 s. The light source 11 may notably be a suspended filament light source heated to a temperature comprised between 400° C. and 800° C. Its emission spectrum, in the emission spectral band $\Delta_{12}$, corresponds to the emission spectrum of a black body.

The measurement photodetector 20 is preferably associated with an optical filter (optical measurement filter 18), defining the measurement spectral band $\Delta_{20}$, which encompasses all or some of the absorption spectral band $\Delta_x$ of the gaseous species.

In the example in question, the measurement photodetector 20 is a thermopile, able to deliver a signal dependent on the intensity of the detected light wave. Alternatively, the measurement photodetector may be a photodiode or another type of photodetector.

The reference photodetector $20_{ref}$ is placed beside the measurement photodetector 20 and is of the same type as the latter. It is associated with an optical filter, called the reference optical filter $18_{ref}$. The reference optical filter $18_{ref}$ defines the reference spectral band $\Delta_{ref}$ corresponding to a range of wavelengths not absorbed by the gaseous species in question. The reference passband $\Delta_{ref}$ is, for example, centered on the wavelength 3.91 µm.

The intensity I(k) of the light wave 14 detected by the measurement photodetector 20, called the measurement intensity, at a measurement time k, depends on the amount $c_x(k)$ at the measurement time, according to the Beer-Lambert equation:

$$\text{abs}(k) = 1 - \frac{I(k)}{I_0(k)} = 1 - e^{-\mu(c_x(k))l} \qquad \text{(Expression (1))}$$

where:
- $\mu(c_x(k))$ is an absorption coefficient dependent on the amount $c_x(k)$ at the time k;
- l is the thickness of gas passed through by the light wave in the chamber 10;
- $I_0(k)$ is the intensity of the incident light wave, at the time k, which corresponds to the intensity of the light wave, in the measurement spectral band $\Delta_{20}$, reaching the measurement photodetector 20 in the absence of absorbent gas in the chamber.

The comparison between I(k) and $I_0(k)$, taking the form of a ratio $$\frac{I(k)}{I_0(k)},$$

allows an absorption abs(k) generated by the gaseous species in question at the time to be defined.

During each pulse of the light source 11, it is thus possible to determine $\mu(c_x(k))$, this allowing $c_x(k)$ to be estimated given that the relationship between $c_x(k)$ and $\mu(c_x(k))$ is known.

Expression (1) assumes control the intensity $I_0(k)$ of the incident light wave 12 at the measurement time k.

Figure 1B:
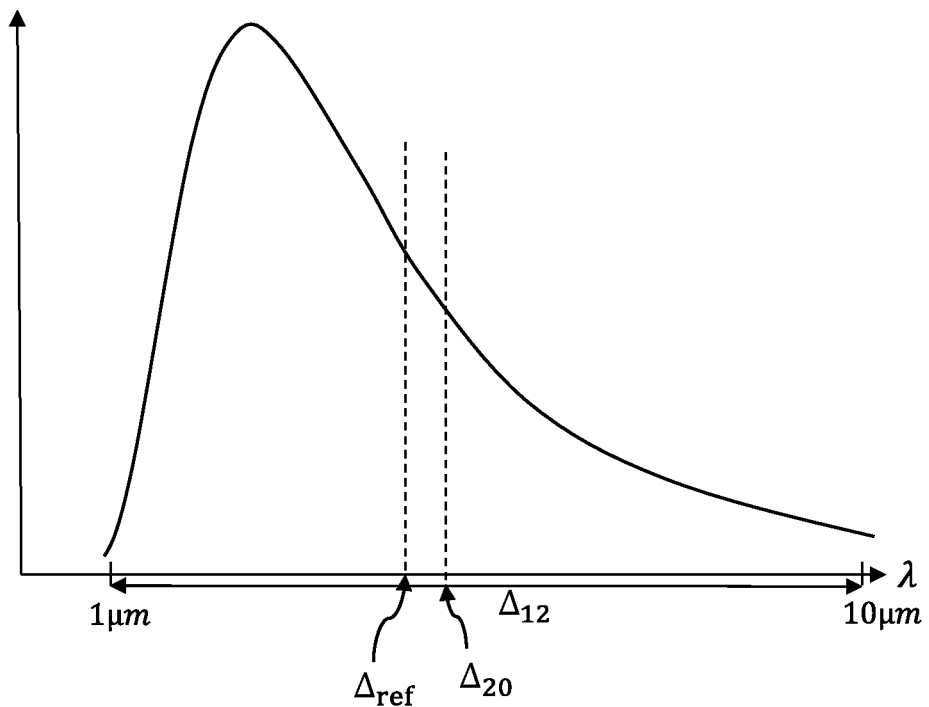
FIG. 1B schematically shows an emission spectrum of a light source of black-body type.

FIG. 1B schematically shows an emission spectrum of a light source 11 of black-body type, obeying Planck's law:

$$L(\lambda, T) = \frac{2hc^2}{\lambda^5} \frac{1}{e^{\frac{hc}{\lambda kT}} - 1} \qquad \text{(Expression (2))}$$

where:
- $L(\lambda,T)$ is the radiance, which is dependent on the wavelength $\lambda$ and the surface temperature T of the black body,
- h is Planck's constant,
- k is Boltzmann's constant,
- c is the speed of light in air.

The emission spectrum S of the light source 11 corresponds to the variation in the radiance $L(\lambda, T)$ as a function of $\lambda$, when the light source is raised to a temperature T. Generally, the temperature T is comprised between 400° C. and 800° C.

FIG. 1B shows the illumination spectral band $\Delta_{12}$ of the light source 11, which extends between 1 µm and 10 µm. The reference spectral band $\Delta_{ref}$ has also been shown, by a dashed line.

This type of light source is particularly advantageous, because it allows the illumination spectrum S to be modulated by simply modulating the temperature T of the source. Thus, with each temperature T is associated one illumination spectrum S.

It is known that the emissivity of a light source, of black-body or gray-body type, varies over time, and may notably undergo a decrease resulting from aging of the light source. This temporal variation in the emission of the light source 11 is taken into account by the reference photodetector $20_{ref}$. The latter is arranged to detect a reference light wave $12_{ref}$, representative of the incident light wave 12 emitted by the light source 11. The reference light wave $12_{ref}$ reaches the reference photodetector $20_{ref}$ without interacting with the gas G, or without significantly interacting with the latter. The intensity of the reference light wave $12_{ref}$, detected by the reference photodetector $20_{ref}$, at the measurement time k, is designated by the term reference intensity $I_{ref}(k)$. From $I_{ref}(k)$, if the emission spectrum of the light source 11 is known, it is possible to estimate the intensity $\hat{I}_0(k)$ of the light wave that would reach the measurement photodetector 20 in the absence of gas G. The reference intensity may also allow the measurement intensity I(k) to be corrected to take into account the aging of the light source 11.

The device comprises a microprocessor 30, connected to a memory 32 containing instructions allowing steps (described below) of the method to be implemented.

According to a first embodiment, the microprocessor 30 is configured to receive a signal representative of the intensity $I_{ref}(k)$ of the reference light wave $12_{ref}$, measured by the reference photodetector $20_{ref}$ at each measurement time k. The microprocessor 30 estimates the intensity $\hat{I}_0(k)$ from $I_{ref}(k)$.

On the basis of I(k), it is possible to estimate the absorption of the incident light wave using the expression:

$$\text{abs}(k) = 1 - \frac{I(k)}{\hat{I}_0(k)}. \qquad \text{(Expression (3))}$$

Using Expression (1), $\mu(c_x(k))$ then $c_x(k)$ are then obtained.

According to a second embodiment, the microprocessor 30 is configured to receive a signal representative of the reference intensity $I_{ref}(k)$, then to perform a correction of the measured intensity $I(k)$. The corrected intensity is denoted $I^*(k)$. The latter corresponds to the intensity that would be measured by the measurement photodetector without aging of the light source. The absorption abs(k) of the incident light wave may then by obtained via the expression:

$$\text{abs}(k) = 1 - \frac{I^*(k)}{I_0(k=0)}, \quad \text{(Expression (4))}$$

where $I_0(k=0)$ represents the light wave incident on the measurement photodetector, without absorbent gas in the chamber, at the initial measurement time k=0, i.e., when the light source 11 may be considered to be new. Using Expression (1), $\mu(c_x(k))$ then $c_x(k)$ are then obtained.

The ratio between the emissivity of the light source 11 in the reference spectral band $\Delta_{ref}$ and in the measurement spectral band $\Delta_{20}$ is usually considered to decrease in the same way. Under such an assumption:

when the first embodiment is implemented, the intensity $\hat{I}_0(k)$ is simply estimated from $I_{ref}(k)$ on the basis of knowledge of the theoretical emission spectrum of the light source, or using an expression such as $$\hat{I}_0(k) = I_{ref}(k) \frac{I_0(k=0)}{I_{ref}(k=0)}; \quad \text{(Expression (5))}$$

when the second embodiment is implemented, the corrected intensity $I^*(k)$ is obtained from $I_{ref}(k)$ by applying a correction function:

$$I^*(k) = \frac{I_{ref}(k=0)}{I_{ref}(k)} I(K). \quad \text{(Expression (6))}$$

However, the inventor has observed that the aging of the light source 11 affects the reference spectral band $\Delta_{ref}$ and measurement spectral band $\Delta_{20}$ differently. Contrary to what is suggested in document FR3000548, the aging in the measurement spectral band cannot be considered to be similar to the aging in the reference spectral band. To determine this, the inventor performed an experimental calibration, which will now be described with reference to FIGS. 2A to 2C. He used a measurement test sensor 20' and reference test sensor 20'$_{ref}$ that were similar to the measurement and reference sensors described with reference to FIG. 1A, respectively. During the calibration, the analyzed gas was a known gas, in the present case $CO_2$ in a concentration of 400 ppm. The experimental parameters were as follows:

Measurement filter 18: Heimann F4.26-180 filter centered on a wavelength of 4.26 μm.
Reference optical filter 18$_{ref}$: Heimann F3.91-90 filter centered on a wavelength of 3.91 μm.
Measurement and reference photodetectors 20, 20$_{ref}$: Heimann HCM Cx2 Fx thermopile.

In this trial, the measurement filter 18 defined a measurement spectral band $\Delta_{20}$ that was intentionally narrow, so as to allow the aging observed by the inventor to be clearly demonstrated. It will be understood that the invention applies to other measurement spectral bands $\Delta_{20}$, in particular ones wider than the reference spectral band $\Delta_{ref}$.

Figure 2A:
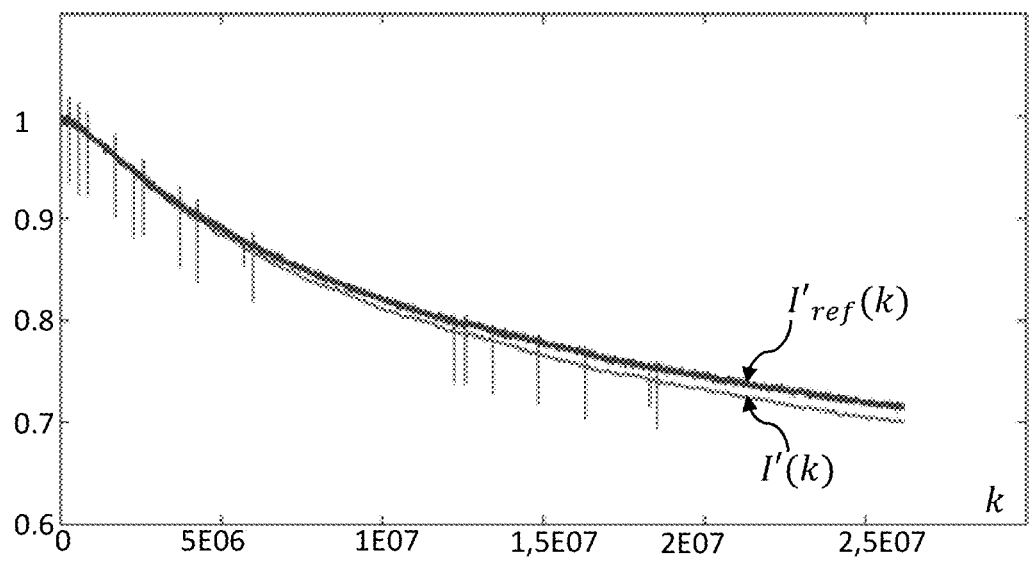
FIG. 2A shows the decrease observed in the light intensity emitted by a light source in two different spectral bands.

A test light source 11', similar to the light source described with reference to FIG. 1A, was activated in a pulsed manner at various times k, between an initial calibration time k=0 and a final calibration time k=K. Each pulse was of 300 ms duration, and was spaced apart from the following pulse by a time interval of 300 ms. About 26 million pulses were generated. FIG. 2A shows the temporal variation:

in a measurement intensity I'(k), measured by the measurement test sensor 20' in the measurement spectral band $\Delta_{20}$; and
in the reference intensity I'$_{ref}$(k), measured by the reference test photodetector 20'$_{ref}$ in the reference spectral band $\Delta_{ref}$.

These variations were normalized by the measurement intensity and the reference intensity at the initial calibration time (k=0), respectively.

The notations I'(k) and I'$_{ref}$(k) designate the fact that these intensities are measured in a calibration phase, using test sensors, a test light source and a known gas. The calibration phase allowed the aging of the light source 11, which is of the same nature as the test light source 11', to be measured.

The fluctuations observed in each curve correspond to temporary, and intentional, variations in the $CO_2$ concentration.

It may be seen that, during the calibration, the measurement intensity I'(k) and the reference intensity I$_{ref}$(k) decreased over time, which was expected. This corresponds to the aging of the light source 11. It may also be seen that the respective decreases in the measurement spectral band $\Delta_{20}$ and in the reference spectral band $\Delta_{ref}$ are different. This means that the aging of the light source 11 in the measurement spectral band $\Delta_{20}$ is different from the aging of the light source 11 in the reference spectral band $\Delta_{ref}$. Thus, the ratio $$\frac{I'(k)}{I'_{ref}(k)}$$

varies as a function of the time k. This means that the aging of the light source 11 is accompanied by a slight modification in the emission spectrum.

Figure 2B:
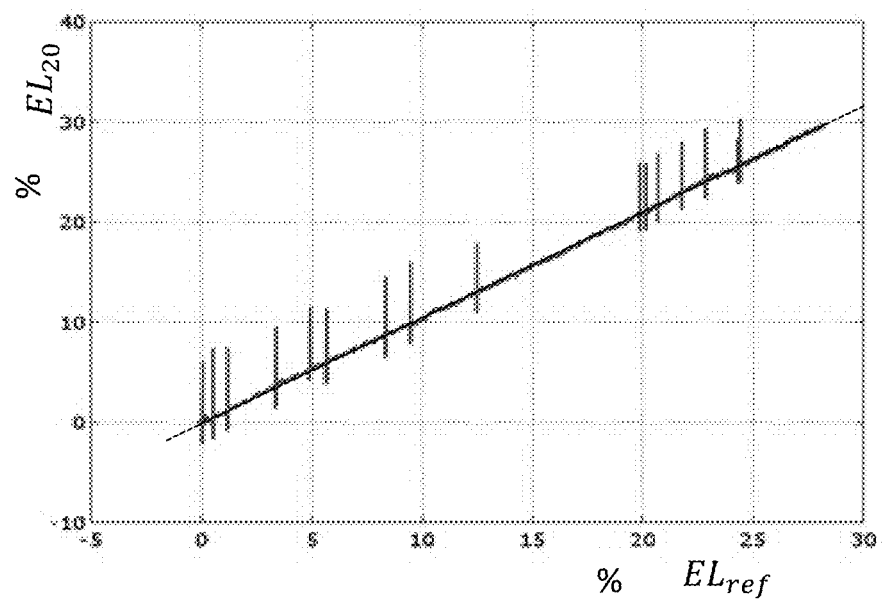
FIG. 2B illustrates the loss of emissivity of the light source in a measurement spectral band as a function of the loss of emissivity of the light source in a reference spectral band.

FIG. 2B shows the emissivity loss $EL_{20}$ in the measurement spectral band (y-axis) as a function of the emissivity loss in the reference spectral band $EL_{ref}$ (x-axis), The emissivity losses, expressed in %, in each spectral band are respectively obtained, at each time k, using the expressions:

$$EL_{ref}(k) = \frac{I'_{ref}(k=0) - I'_{ref}(k)}{I'_{ref}(k=0)} \times 100 \text{ and} \quad \text{(Expression (7))}$$

$$EL_{20}(k) = \frac{I'(k=0) - I'(k)}{I'(k=0)} \times 100 \quad \text{(Expression (8))}$$

The fluctuations of the curve of FIG. 2B correspond to temporary variations in $CO_2$ concentration, i.e., variations such as mentioned with reference to FIG. 2A. It may be seen that $EL_{20}$ varies linearly as a function of $EL_{ref}$ with a slope A higher than 1. In FIG. 2B, the curve $EL_{20}=EL_{ref}$ has been drawn with a dashed line.

Figure 2C:
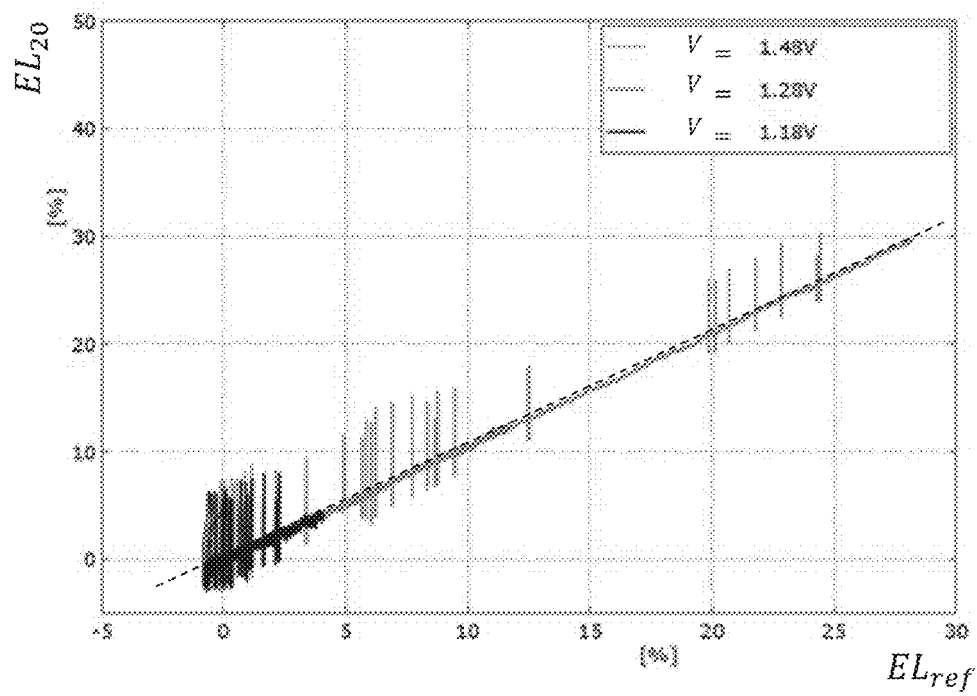
FIG. 2C illustrates the loss of emissivity of the light source in a measurement spectral band as a function of the loss of emissivity of the light source in a reference spectral band, at three different light-source supply voltages.

A similar trial was carried out while varying the supply potential V of the light source 11. Three identical photodetectors were used, each respectively opposite one of three light sources of same type, the potential of which was V=1.48 V, this corresponding to the potential to which the light source was raised in the trial reported in FIG. 2B, V=1.28 V, and V=1.18 V, respectively. FIG. 2C shows the curves $EL_{20}$ as a function of $EL_{ref}$ for each potential V, respectively. When the potential decreases, the emissivity loss is lower that at high potential, because the aging of the light source 11 is less marked. It may be seen however that the three curves superpose. The effect of aging on the emissions in the measurement spectral band $\Delta_{20}$ and in the reference spectral band $\Delta_{ref}$ therefore seem to be independent of the potential to which the light source 11 is raised.

The trial described with reference to FIGS. 2A to 2C may be considered to be a calibration trial, during which the differential aging of the light source 11 in the measurement spectral band $\Delta_{20}$ with respect to the reference spectral band $\Delta_{ref}$ was determined. It was performed with a test sensor, the components of which are similar to those with which the sensor intended to analyze an unknown gas is equipped.

Such a calibration trial allows a correction function $\delta$ characterizing the relative emissivity variation in the two spectral bands $\Delta_{20}$ and $\Delta_{ref}$ to be determined. The correction function $\delta$ comprises a comparison, at each time k, of the reference intensity with the intensity in the measurement spectral band.

In a first approach, the correction function $\delta$ may be such that:

$$I^*(k) = \delta(I(k)) = \qquad \text{(Expression (9))}$$

$$\frac{I(k)}{1 - A \times \frac{EL_{ref}(k)}{100}} = \frac{I(k)}{1 - A \times \frac{I_{ref}(k=0) - I_{ref}(k)}{I_{ref}(k=0)}}$$

A is the slope of a straight line obtained by applying a linear regression to the data shown in FIGS. 2B and 2C. A is a scalar value, representing the differential aging of the light source in each spectral band.

Figure 3:
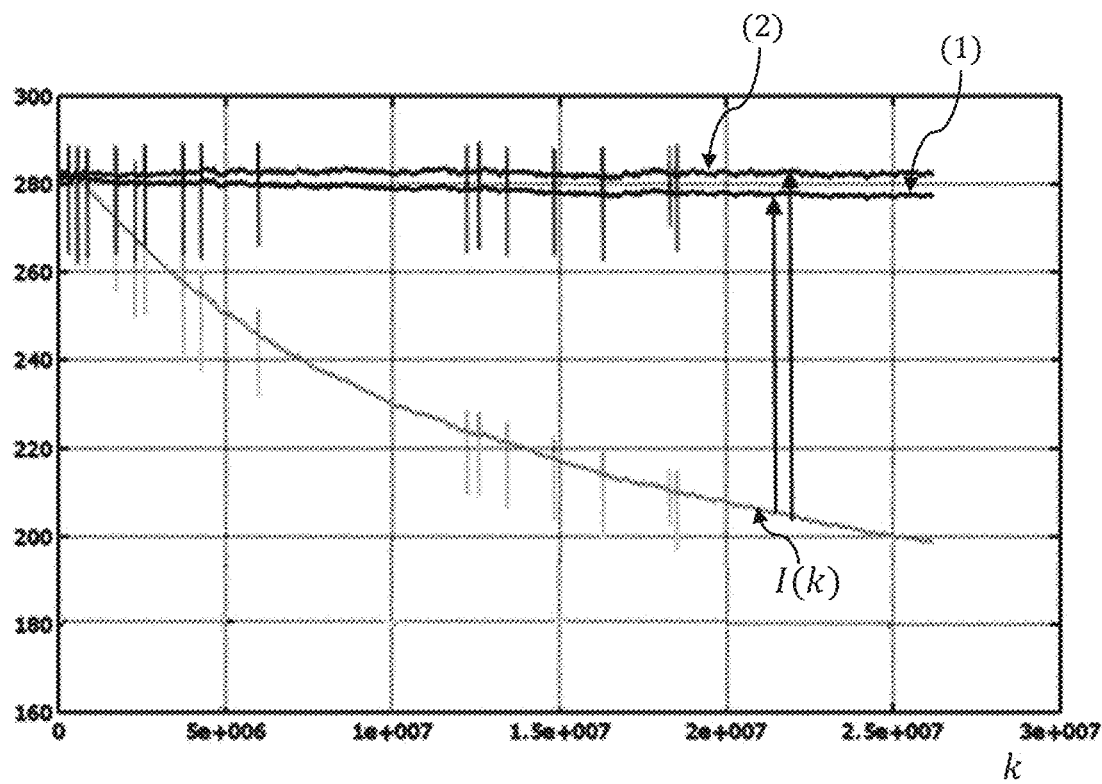
FIG. 3 shows the reference intensity being taken into account to correct the loss of emissivity of the light source in a conventional method and in a method according to the present disclosure, respectively.

FIG. 3 shows an example of a temporal variation in a measurement intensity I(k). This variation corresponds to that measured in FIG. 2A. Two corrections of the measurement signal I(k) have been shown in FIG. 3:

a first correction (curve 1) corresponding to the prior art, this correction being obtained by applying a constant correction factor to I(k) such that $$I^*(k) = \frac{I_{ref}(k=0)}{I_{ref}(k)} I(K); \qquad \text{(Expression (6))}$$

a second correction (curve 2), corresponding to implementation of the present disclosure, this correction being obtained by applying the correction function $\delta$, which varies as a function of time, to $I_{ref}(k)$, such that $$I^*(k) = \delta(I(k)) = \qquad \text{(Expression (10))}$$

$$\frac{I(k)}{1 - A \times \frac{EL_{ref}(k)}{100}} = \frac{I(k)}{1 - A \times \frac{I_{ref}(k=0) - I_{ref}(k)}{I_{ref}(k=0)}}$$

The drift $\varepsilon(K)$ affecting, at the time K, the corrections of I(k) during trials carried out with V=1.48 V were estimated, and are shown in FIG. 3. The drift $\varepsilon(K)$ is expressed in % according to the expression:

$$\varepsilon(K) = \frac{I(k=0) - I^*(K)}{I(k=0)} \times 100. \qquad \text{(Expression (12))}$$

It may be seen:
that by applying the first correction, according to Expression (6), the value of $\varepsilon(K)$ is 1.34%; and
that by applying the second correction, according to Expression (10), the value $\varepsilon(K)$ is 0.08%.

Figure 4:
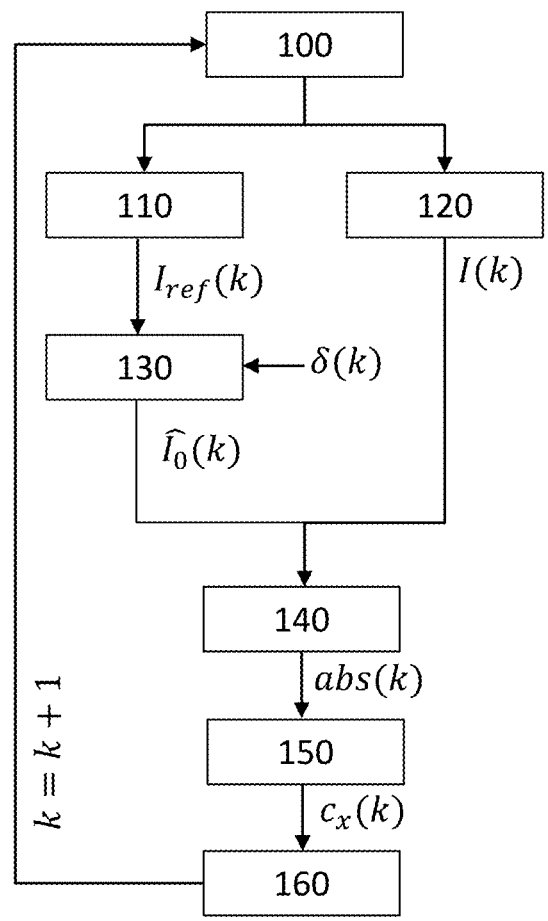
FIG. 4 shows the mains steps of a method implementing the present disclosure.

FIG. 4 shows the main steps of a measuring method implementing the invention:

Step 100: illuminating the gas at a time k.

Step 110: measuring the reference intensity $I_{ref}(k)$, in the reference spectral band $\Delta_{ref}$, with the reference photodetector $20_{ref}$.

Step 120: measuring the intensity I(k) of the radiation (light wave 14) transmitted by gas, in the measurement spectral band $\Delta_{20}$, with the measurement photodetector 20.

Step 130: estimating an intensity $\hat{I}_0(k)$ that would be detected by the measurement photodetector 20, in the measurement spectral band $\Delta_{20}$, in the absence of gas in the chamber. The estimation is performed taking into account the correction function $\delta(k)$, and by applying the expression:

$$\hat{I}_0(k) = \delta(I_{ref}(k)) = \hat{I}_0(k=0)\left(1 - A \times \frac{EL_{ref}(k)}{100}\right) = \qquad \text{(Expression (13))}$$

$$\hat{I}_0(k=0)\left(1 - A \times \frac{I_{ref}(k=0) - I_{ref}(k)}{I_{ref}(k=0)}\right).$$

$\hat{I}_0(k=0)$ corresponds to the estimation of the intensity $\hat{I}_0(k)$ at k=0.

Step 140: estimating an absorption $$\text{abs}(k) = 1 - \frac{I(k)}{\hat{I}_0(k)}$$

in the measurement spectral band $\Delta_{20}$.

Step 150: on the basis of the absorption, estimating an amount $c_x(k)$ of a gaseous species $G_x$ from the ratio by applying Expression (1).

Step 160: reiterating steps 100 to 150, while incrementing the measurement time k, or exiting from the algorithm.

This embodiment is advantageous because, following the calibration, only the value of the differential aging A need be retained, to be able to apply the correction function $\delta$ to each measurement of the reference intensity $I_{ref}(k)$ measured at each measurement time k.

It is possible to consider other expressions for the correction function $\delta$. For example, the correction function $\delta$ may be such that $$\delta(k) = \frac{\frac{I'_{ref}(k)}{I'_{ref}(k=0)}}{\frac{I'(k)}{I'(k=0)}}. \qquad \text{(Expression (14))}$$

In step 130, the estimation of $\hat{I}_0(k)$ is then obtained by $$\hat{I}_0(k) = \delta(k) I_{ref}(k) \frac{I(k=0)}{I_{ref}(k=0)}. \qquad \text{(Expression (15))}$$

According to one variant, in step 130, the value I(k) of the intensity measured by the measurement sensor is corrected with the correction function δ. A corrected intensity I*(k) is obtained. The correction function δ may be expressed by Expression (9), such that I*(k)=

$$\delta(I(k)) = \frac{I(k)}{1 - A \times \frac{EL_{ref}(k)}{100}} = \frac{I(k)}{1 - A \times \frac{I_{ref}(k=0) - I_{ref}(k)}{I_{ref}(k=0)}}.$$

It may also be expressed by Expression (14), in which case $$I^*(k) = \delta(k)I(k)\frac{I_{ref}(k=0)}{I_{ref}(k)}. \qquad \text{(Expression (16))}$$

According to this variant, in step 140, the absorption is obtained using the expression:

$$\text{abs}(k) = 1 - \frac{I^*(k)}{\hat{I}_0(k=0)}. \qquad \text{(Expression (17))}$$

Thus, generally, the calibration phase allows the relative decrease, over time, in the intensity of the illuminating radiation produced by the light source in the reference spectral band and the measurement spectral band to be evaluated. The correction function comprises a comparison of the decrease in each spectral band. Use of the correction function δ(k) allows the variation in the decrease in the intensity of the illuminating radiation (light wave 12) in the two spectral bands to be taken into account, so as to obtain an estimation of the intensity $\hat{I}_0(k)$ that would be measured by the measurement photodetector in the absence of gas;

or a corrected intensity I*(k) that would be measured by the measurement photodetector without aging of the light source.

Embodiments of the present disclosure will possibly be employed to detect an amount of a gaseous species $G_x$ the absorption spectrum $\Delta_{20}$ of which is contained in the measurement spectral band $\alpha_{20}$. The latter may be narrow, as in the experimental example described above. It may also be wide, so as to include, for example, the absorption spectral bands $\Delta_x$ of a plurality of different gaseous species.

The invention claimed is:

1. A method for measuring an amount of a gaseous species within a gas, the gaseous species absorbing light in an absorption spectral band, the method comprising:
    a) placing the gas between a light source and a measurement photodetector, the light source being configured to emit an incident light wave;
    b) illuminating the gas with the light source so that the incident light wave propagates through the gas to the measurement photodetector;
    c) measuring, with the measurement photodetector, a measurement intensity of a light wave transmitted by the gas, in a measurement spectral band, containing the absorption spectral band;
    d) measuring, with a reference photodetector, a reference intensity of a reference light wave, the reference light wave being emitted by the light source in a reference spectral band;

wherein b) to d) are carried out at a plurality of measurement times, the method further comprising, at each measurement time:
    e) estimating an absorption of the incident light wave by the gas, using the reference intensity measured by the reference photodetector, and the measurement intensity, measured by the measurement photodetector;
    f) estimating an amount of the gaseous species, on the basis of the absorption estimated in e);
wherein e) comprises taking into account a correction function, representative of a temporal variation in an intensity of the incident light wave in the measurement spectral band relative to an intensity of the incident light wave in the reference spectral band;
wherein the correction function is established beforehand in a calibration phase, comprising:
    cal-i) placing a test light source, facing a measurement test photodetector, and facing a reference test photodetector, the test light source, the measurement test photodetector and the reference test photodetector being representative of the light source, of the measurement photodetector and of the reference photodetector, respectively;
    cal-ii) illuminating the measurement test photodetector and the reference test photodetector with the test light source, during calibration times lying in a calibration period;
    cal-iii) comparing a temporal variation in the intensity detected by the measurement test photodetector in the measurement spectral band, with a temporal variation in the intensity detected by the reference test photodetector in the reference spectral band.

2. The method of claim 1, wherein the correction function is representative of a comparison between:
    the intensity of the incident light wave in the measurement spectral band;
    the intensity of the incident light wave in the reference spectral band;
the comparison taking different values at various measuring times.

3. The method of claim 1, wherein the test light source is pulsed, each pulse corresponding to one calibration time, wherein the calibration period contains at least $10^3$ calibration times.

4. The method of claim 1, wherein the correction function is established based on comparisons, at various calibration times, between:
    the intensity detected by the measurement test photodetector, normalized by an initial intensity detected by the measurement test photodetector at an initial calibration time;
    the intensity detected by the reference test photodetector, normalized by an initial intensity detected by the reference test photodetector at the initial calibration time.

5. The method of claim 1, wherein e) comprises, on the basis of the reference intensity measured at the measurement time and of the correction function, estimating an intensity that would be detected, at the measurement time, by the measurement photodetector, in the measurement spectral band, without gas between the light source and the measurement photodetector.

6. The method of claim 1, wherein e) comprises, on the basis of the reference intensity measured at the measurement time and of the correction function, correcting the measurement intensity, the corrected measurement intensity corresponding to a measurement intensity in the absence of aging of the light source.

7. A device for determining an amount of a gaseous species in a gas, the device comprising:
- a light source configured to emit an incident light wave that propagates to the gas, the incident light wave lying in an absorption spectral band of the gaseous species;
- a measurement photodetector, configured to detect a light wave transmitted by the gas, at various measurement times, in a measurement spectral band and to measure a measurement intensity thereof;
- a reference photodetector, configured to measure a reference intensity of a light wave emitted by the light source, in a reference spectral band, at the various measurement times;
- a processor configured to implement acts e) and f) of the method of claim 1, using the reference intensity and the measurement intensity.

\* \* \* \* \*

UNITED STATES PATENT AND TRADEMARK OFFICE
CERTIFICATE OF CORRECTION

PATENT NO. : 11,448,590 B2
APPLICATION NO. : 16/967209
DATED : September 20, 2022
INVENTOR(S) : Thanh Trung Le It is certified that error appears in the above-identified patent and that said Letters Patent is hereby corrected as shown below:

In the Specification

| | | |
|---|---|---|
| Column 6, | Line 1, | change "control the" to --control of the-- |
| Column 10, | Line 9, | change "value $\varepsilon$" to --value of $\varepsilon$-- |
| Column 10, | Line 17, | change "by gas" to --by the gas-- |
| Column 11, | Line 46, | change "band $\alpha_{20}$" to --band $\Delta_{20}$-- |

Signed and Sealed this
Eleventh Day of July, 2023

*Katherine Kelly Vidal*

Katherine Kelly Vidal
*Director of the United States Patent and Trademark Office*